United States Patent

Calud

[15] 3,638,480
[45] Feb. 1, 1972

[54] DUAL-STATOR INDUCTION MOTOR TORQUE SENSOR AC DYNAMOMETER

[72] Inventor: Romeo T. Calud, Beloit, Wis.
[73] Assignee: Bucyrus-Erie Company, Milwaukee, Wis.
[22] Filed: Nov. 21, 1969
[21] Appl. No.: 878,860

[52] U.S. Cl. .............................................73/134, 73/136 R
[51] Int. Cl. ..............................................................G01l 3/00
[58] Field of Search ....................73/59, 134, 136; 324/142; 310/191; 318/243, 437, 538, 539

[56] References Cited

UNITED STATES PATENTS

| | | | |
|---|---|---|---|
| 1,144,012 | 6/1915 | Walton | 318/243 |
| 1,942,920 | 1/1934 | Fawkes | 73/59 |
| 2,448,533 | 9/1948 | Laurance | 324/142 X |
| 2,568,406 | 9/1951 | Packer et al. | 73/134 UX |
| 3,068,411 | 12/1962 | Galman | 324/142 |
| 3,079,518 | 2/1963 | Moore | 318/530 X |
| 3,226,641 | 12/1965 | Miller | 324/142 |
| 3,280,400 | 10/1966 | Roe | 318/437 X |
| 3,493,345 | 2/1970 | Windley | 73/59 X |

*Primary Examiner*—Charles A. Ruehl
*Attorney*—Thomas O. Kloehn and Arthur H. Seidel

[57] ABSTRACT

A dual-stator induction motor has a rotor and a stator, which has two segments mounted for relative rotatable adjustment. The rotatable stator segment has a gear sector on it which meshes with a pinion of an actuator motor. The stator segments are energized from a three-phase line. Stator current and voltage are inductively sensed by a watts transducer the output of which is connected to an ammeter. The watts transducer originates at its output an electrical signal proportional to primary watts which accurately reflects torque output. An embodiment of the invention is employed as a dynamometer.

4 Claims, 2 Drawing Figures

3,638,480

PATENTED FEB 1 1972

INVENTOR
ROMEO T. CALUD

BY Thomas P. Kloeh

ATTORNEY

3,638,480

DUAL-STATOR INDUCTION MOTOR TORQUE SENSOR AC DYNAMOMETER

BACKGROUND OF THE INVENTION

Induction motors are, with a few exceptions, constant-speed motors, and are so treated by the authorities in the art as a whole. One exception that is unanimously ignored is the dual stator induction motor which is disclosed in the following United States Patents, among others: U.S. Pat. Nos. 497,113; 510,534; 727,662; 1,144,012; 2,660,523; 2,675,494; 3,017,528; 3,280,400; 3,280,928; 3,290,574 and 3,340,450. Dual-stator induction motors have a common, wound rotor or squirrel cage rotor, but the stator is formed of two or more equal, relatively rotatable adjustable segments. Preferably the stator has two equal segments that are energized in common, and one of the segments is rotatably mounted with respect to the other, which is fixed in the motor shell. By rotatably adjusting the movable stator section the phase relationship of the voltage induced in the secondary, or rotor, can be changed with a result that the rotor torque varies from practically zero to maximum torque.

A major obstacle to the practical implementation of dual-stator induction motors, notwithstanding the rich potential of such motors, has been the lack of an accurate means for continually sensing and indicating the torque being generated by the motor. Stator position indicates the command being made to the motor, but since the motor might be operating at any speed within a broad range for every possible stator position, the stator position is scarcely an adequate indicator of the actual torque output of the motor. Methods for directly sensing torque in standard single stator induction motors are known to the art. (A dual-stator induction motor can be operated as a conventional induction motor by simply locking the ordinarily rotatably adjustable stator segments in a fixed, in-phase relationship so that the motor for all practical purposes becomes a conventional induction motor, and then its measurable electrical characteristics likewise mirror those of a conventional induction motor. See also, for example U.S. Pat. No. 2,805,375. For the purposes of this disclosure a dual-stator induction motor thus used is considered a conventional induction motor, and when dual-stator induction motors are referred to the reference contemplates a variable-speed variable-torque motor which has stator segments that are in fact relatively rotatably adjustable).

However, the relationships between electrical phenomena and output torque that have been discovered to exist in conventional induction motors have been found not to prevail for any practical good in dual-stator induction motors. For example, in conventional induction motors, there is generally a linear relationship between secondary watts and output torque, but this relationship is not valid as applied to dual-stator induction motors. Similarly the relationship between torque output and secondary current squared fails to hold true in dual-stator induction motor. Also, it has been found by experiment that there is no linear relationship between either primary current or primary volts and torque output. Hence none of the common indicia of torque output expected in a conventional induction motor will serve the purpose for dual-stator induction motors. In summary, at the time the present invention was made a reliable indicator of motor torque output of a dual-stator type of induction motor which will hold true for all possible stator adjustments and all possible operating conditions was urgently needed, but the complete breakdown of the techniques and formulas developed for conventional induction motors when these are applied to dual-stator drive motors dimmed all prospect of satisfying that need.

SUMMARY OF THE INVENTION

The present invention relates to a method and means for sensing the torque output of a dual-stator induction motor; and more specifically the invention resides in a dual-stator induction motor which has at least two relatively rotatably adjustable stator segments that are connected for energization to an alternating current line, and a transducer which senses the magnitude of current through the stator segments and the magnitude of voltage across the stator segments and which generates an electrical signal proportional to the product of said magnitudes sensed. In a dynamometer embodiment of this invention, the dual-stator induction motor has its rotor connected to a machine to be tested, a controllable actuator is mounted on the dual-stator motor to rotatably adjust the relatively rotatably adjustable stator segments, and output terminals of the transducer are connected across a meter which indicates the torque generated by the motor.

The torque sensor embodying the present invention quite unaccountably and unexpectedly has been found empirically to sense the torque output of the motor under all operating conditions and to provide a signal that accurately indicates the torque output of the motor under all operating conditions. The electrical characteristics prevailing at any time during the operation of a dual-stator drive motor, except when it is operated as a conventional single-stator induction motor, are so numerous and complex as to have defied all attempts at analysis. Hence it is not known why, nor was there any expectation that a linear relationship exists between the power flow into the primary and output torque for a dual-stator induction motor. Nevertheless, practical experience demonstrates indubitably that such a relationship does exist. The discovery of the relationship between primary power and torque output was perceived in the data collected in innumerable tests by meticulously and detailed observation. The salient fact implicit in this discovery is that there is now available a highly reliable, readily feasible and commercially economical means for providing continuous accurate indications of torque output of dual-stator induction motors under any operating conditions.

The dynamometer embodying the present invention is a highly versatile, accurate and economical instrument. It is capable of accurately measuring the torque of any machine under any operating conditions including stall, all forward speeds and even counter rotating speeds if that is desired. This dynamometer requires only a relatively simple motor and eliminates such things as trunnion bearings required by other dynamometers. Also, heat that may be abundantly generated in testing can be efficiently dissipated with external secondary resistors. For all its versatility as a test instrument, the dynamometer of the present invention is readily usable for conventional industrial drive purposes where operator readings of motor torque output are usable.

DESCRIPTION OF THE PREFERRED EMBODIMENT

Figure 1:
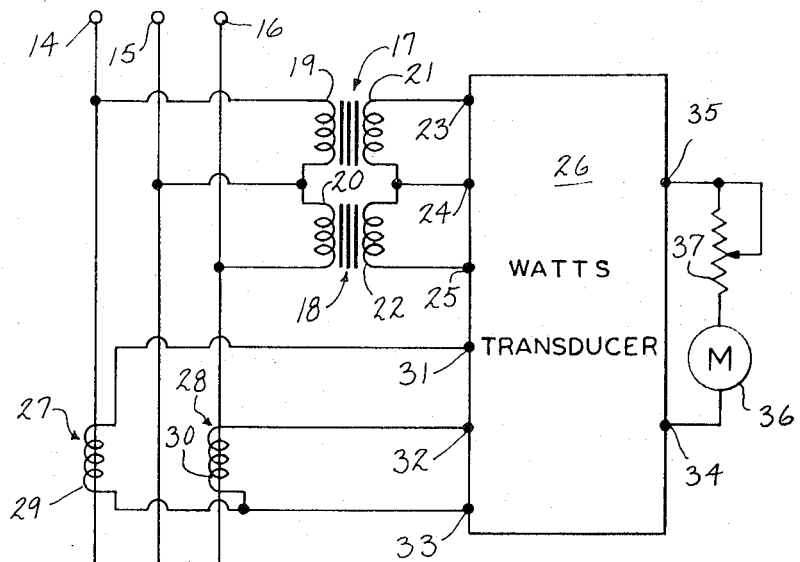
FIG. 1 is a schematic diagram of a dynamometer embodying the present invention including a torque embodying the present invention.
Figure 2:
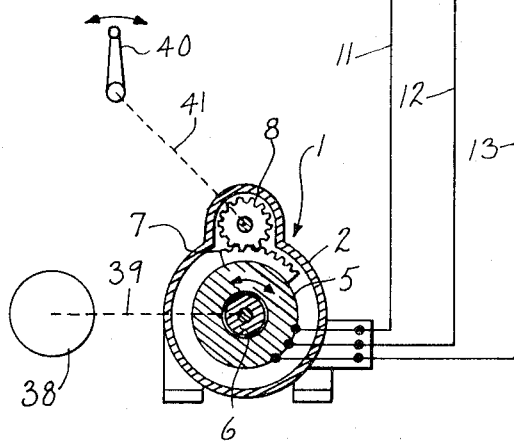
FIG. 2 is a side elevation with portions broken away illustrating a dual-stator induction motor having two equal stator elements, one of which is fixedly mounted and the other is rotatably adjustably mounted.
Figure 2:
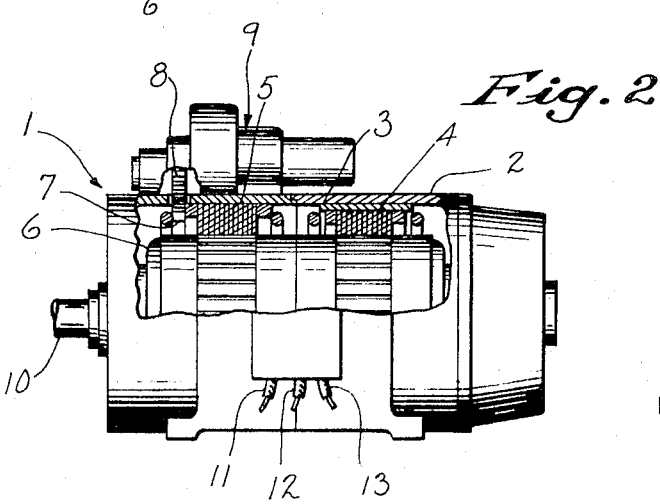

Both FIGS. 1 and 2 contain showings of a dual-stator induction motor 1 which has a shell 2 containing a stator 3. The stator 3 is made up of two two substantially identical stator segments 4 and 5. One stator segment 4 is mounted in fixed position relative to the motor shell and the other stator segment 5 is mounted for limited rotary movement about a rotor 6 and relative to the fixed stator 4 and shell 2. The rotatably adjustable stator segment 5 has a gear sector 7 mounted on it, and a pinion 8 of a rotary actuator 9 that is mounted on the outside of the motor shell 2 is meshed in driving engagement with the sector 7. In this instance, the rotary actuator is a small DC motor but a commonly hydraulic motors are used for this purpose, and, for that matter, any number of expedients might be employed to move the rotatably mounted stator segment through the approximately 90° of rotation for which it is adapted. The rotor 6 is mounted on an output shaft 10 of the dual-stator induction motor, and the output shaft 10 may be connected through a transmission (not shown) to a load to be driven by it.

The dual-stator induction motor is preferably a polyphase motor so that it may be reversed easily, and in this instance it is a three-phase motor to make it compatible with the most common form of commercial power. Thus, the stator 3 including both stator segments 4 and 5 is connected through a three-power line 11, 12 and 13 system to a three-phase source, which is represented by the terminals 14, 15 and 16.

Two voltage transformers 17 and 18 are connected across the power lines 11–13 by having one primary winding 19 connected from one line 11 to the middle line 12 and a primary 20 of the other connected from the middle line 12 to the other line 13. The voltage transformers 17 and 18 have their secondary windings 21 and 22 connected to voltage input terminals 23, 24 and 25 of a watts transducer 26. Two current transformers 27 and 28 have their secondary windings 29 and 30, respectively, mounted about the outside power lines 11–13 and connected to current input terminals 31, 32 and 33 of the watts transducer 26. The watts transducer 26 is a commercially purchased component, which can produce either a DC current or a DC voltage directly proportional to the input power into the stator 3 of the motor 1.

The watts transducer 26 has a pair of output terminals 34 and 35, which in this embodiment may be considered current output terminals 34 and 35, across which is connected a current meter 36 in series with a variable resistor 37. The current meter 36 is calibrated according to the range of output currents generated by the watts transducer to reflect the torque output at the shaft 10 of the motor 1. Since the torque output at the shaft 10 of the dual-stator induction motor 1 is discovered to be directly proportional to the primary or stator 3 power input, the reading of the current meter 36, which reflects a DC signal that is directly proportional to power into the primary 3, will accurately reflect the torque output at the output shaft 10. The current meter 36 serves as an indicator to receive the output signal from the watts transducer 26 and convert it into an indication of the torque output of the motor 1 in a form, here visual, that is usable by the motor controller, here a human operator.

The embodiment of this invention as shown in the drawings is readily applicable and highly versatile as a dynamometer by connecting a machine 38 to be tested to the output shaft 10 with an appropriate transmission 39, represented by a broken line in the drawings. A manual control 40 for the adjustable stator actuator 9 is connected through an appropriate control apparatus 41 to the actuator 9 used to control the position of the rotatable stator segment 5.

To utilize the present invention, the stator 3 of the dual-stator induction motor which is divided into the two equal segments 4 and 5, is energized by connecting it through the power lines 11, 12 and 13 to the three-phase AC source 14, 15 and 16. The voltage transformers 17 and 18 that are connected across the power lines 11–13 sense the magnitude of the voltage across the stator 3. The pair of transformers 27 and 28 that connected in series between the stator 3 and the AC source 14–16 sense the magnitude of the current flowing through the stator 3. The electrical samples obtained by the voltage transformers 17 and 18 and the current transformers 27 and 28 are multiplied together by the watts transducer 26 to produce a product proportional to the power into the stator 3 of the dual-stator drive motor 1. A DC electrical output signal proportional to the power into the motor 1 is generated by the watts transducer 26 and appears across the output terminals 34 and 35 of the watts transducer 26. The DC electrical output signal is transmitted to an indicator appropriate to the controlling agent of the motor. In the preferred embodiment which uses the motor 1 as a dynamometer, the controlling agent is a human operator, so the indicator is a current meter 36 which is calibrated to indicate the torque output on the output shaft 10 of the rotor 6 of the motor. It is possible to utilize this simple current meter 36 because of the linear relationship between power into the stator 3, as sensed by the watts transducer 26, and torque output on the output shaft 10. The operator may vary the torque output of the motor 1, calling for more or less torque, by actuating the control handle 40 which controls the rotary actuator 9 to vary the position of the rotatably adjustable stator segment 5.

To utilize the motor 1 as a dynamometer, the output shaft 10 is connected to a machine 38 to be tested, which may be another electric motor, or an internal combustion engine, or the like. It may be desirable in connection with such a test to know the speed of the motor 1 also and for these purposes it would be a simple matter to connect a tachometer (not shown) to the output shaft 10 or to the machine 38 to be tested. Thus the operator could obtain a torque reading from the meter 36 for any speed of the test machine 38. The operator could also utilize the speed and torque readings to calculate the power output of the test machine 38.

Although in the preferred embodiment the simple current meter 36 is used as an indicator, for different purposes different types of indicators could be used to receive the output signal from the transducer 26 and to indicate the torque output of the motor 1, either for the purpose of recording information, as when the motor 1 is used as a dynamometer, or for the purpose of controlling the motor 1. The form in which the torque is indicated will be determined by the particular recipient of the information from the watts transducer 26 and the desired application of this invention. Where the invention is utilized to control the motor 1, the output of the indicator, whatever its form, can be deemed a torque feedback signal and the indicator will be chosen to provide a torque feedback signal that is compatible with the rest of the control system, whether it be a human operator or some form of automated control.

The foregoing drawings and written description of the best mode presently contemplated for carrying out the invention not only sets forth the invention, but also describes the manner and process of making and using it in such full, clear, concise, and exact terms as to enable any person skilled in the art to which it pertains, or with which it is most nearly connected, to make and use the same. By contrast to the preferred embodiment described above, the subject matter which the applicant regards as his invention is particularly pointed out and distinctly claimed in the claims that follow.

I claim:

1. A method for measuring the torque output of a dual-stator induction motor having at least two relatively rotatably adjustable stator segments energized by an AC source and a common rotor, the method comprising the steps of
    sensing the total electrical power flowing into said stator segments by means of a transducer;
    and generating an electrical output signal in said transducer proportional to said power into said stator segments which output signal is substantially linearly related to the torque of said motor.

2. A method as set forth in claim 1 wherein
    said output signal is transmitted to an indicator calibrated to translate said electrical output signal to an indication of torque output of said motor.

3. A dynamometer for measuring the torque output of a test machine, the combination comprising:
    a dual-stator induction motor having at least two relatively rotatably adjustable stator segments and a rotor connected through an output shaft to said test machine;
    an actuator mechanically lined to said relatively rotatably adjustable stator segments and adapted to relatively rotatably adjust said stator segments;
    a control for controlling the operation of said actuator;
    a watts transducer connected to measure the total electrical power into said stator segments and generate a DC electrical output signal proportional thereto; and indicator means connected to receive said watts transducer DC output signal and calibrated to provide a visual indication of torque output of said test motor.

4. A dynamometer as set forth in claim 3, wherein said dual-stator induction motor has two substantially equal stator segments and one of said stator segments is rotatably adjustable relative to the other of said two stator segments;

said actuator is a rotary actuator connected to rotate said relatively rotatably adjustable stator segment; and said control is a manual control connected to said rotary actuator to control said rotary actuator.

* * * * *

PO-1050
(5/69)

UNITED STATES PATENT OFFICE
CERTIFICATE OF CORRECTION

Patent No. 3,638,480          Dated April 17, 1972

Inventor(s) Romeo T. Calud

It is certified that error appears in the above-identified patent and that said Letters Patent are hereby corrected as shown below:

Description:

Col. 2, line 54 after "torque" insert --indicator--

In the Claims:

Col. 4, line 59 after "torque" insert --output--

Col. 4, line 69 change "line" to --linked--

Signed and sealed this 1st day of August 1972.

(SEAL)
Attest:

EDWARD M. FLETCHER, JR.      ROBERT GOTTSCHALK
Attesting Officer             Commissioner of Patents